United States Patent Office 3,483,171
Patented Dec. 9, 1969

3,483,171
PROCESS FOR THE PRODUCTION OF COPOLY-
MERS OF VINYL ESTERS AND ETHYLENE
Alfred Kühlkamp, Hofheim, Taunus, and Leonhard
Reihs, Mainz-Mombach, Germany, assignors to
Farbwerke Hoechst Aktiengesellschaft vormals
Meister Lucius & Brüning, Frankfurt am Main,
Germany, a corporation of Germany
No Drawing. Filed July 15, 1965, Ser. No. 472,338
Claims priority, application Germany, July 18, 1964,
F 43,493
Int. Cl. C08f 15/40, 15/16
U.S. Cl. 260—80.6
8 Claims

ABSTRACT OF THE DISCLOSURE

A process for producing copolymers of ethylene, vinyl esters and, if desired, up to 50% by weight of the vinyl ester of unsaturated comonomers that are copolymerizable with the vinyl esters. Polymerization is effected in aqueous suspension with a free radical catalyst using an ethylene pressure up to 300 atmospheres. The process is characterized by the fact that the vinyl ester with the catalyst dissolved therein is fed incrementally to the reaction mixture to produce copolymers having a relatively higher ethylene content. In accordance with a particularly advantageous modification, the vinyl ester solution of catalyst is sprayed into the vapor phase above the liquid reaction mixture. The products may be used as primers for lacquers, adhesives for bonding sheets and interlayers of safety glass, thermoplasts and vibration-damping materials.

The present invention relates to a process for the production of copolymers of vinyl esters and ethylene.

It is known that copolymers of vinyl acetate and ethylene can be prepared in bulk, in solution, in emulsion and in suspension.

The present invention is directed to a process for the production of copolymer suspensions of vinyl esters and ethylene which enables large portions of ethylene to be incorporated into the copolymer even at relatively low ethylene pressures.

In U.S. Patent 2,485,796 there is described a process for the production of granular copolymers of vinyl acetate and ethylene in which all reacants are placed in the reaction vessel. When using the process of U.S. Patent 2,485,796 in tests for the production of copolymer suspensions from vinyl acetate and ethylene under different ethylene pressures, the following copolymers were obtained with an ethylene content as shown in the table hereunder.

| Ethylene pressure (atmospheres gage): | Ethylene content (percent) |
|---|---|
| 10 | 1.0/1.2 |
| 15 | 4.1/4.7 |
| 20 | 5.5/6.1 |
| 50 | 12.2/11.0 |
| 150 | 24.1/24.5 |
| 300 | 37.0/37.2 |

It is also described in U.S. Patent 2,485,796 that the copolymers produced have a substantial residual monomer content of vinyl acetate which has to be removed by distillation.

Now we have found that copolymers of ethylene and at least one vinyl ester, preferably an ester of vinyl alcohol and an aliphatic saturated monocarboxylic acid containing 1 to 4 carbon atoms, and, if desired, further monomers copolymerizable with vinyl esters, can be prepared with special advantage according to a suspension polymerization process under the action of a free radical polymerization catalyst by placing the aqueous phase, which contains at least one known suspension stabilizer in the dissolved state, in the polymerization vessel, introducing ethylene under a pressure of up to 300 atmospheres gage, preferably under a pressure within the range of 10 to 100 atmospheres gage, and maintaining the respective ethylene pressure at temperatures within the range of from 40° to 120° C., preferably within the range of from 60° to 85° C., and metering in the vinyl ester or the vinyl esters containing the catalyst in the dissolved state, if desired, together with the other monomers copolymerizable with vinyl esters, during the reaction in a continuous manner, for example in the course of 2 to 10 hours, preferably in the course of 3 to 6 hours, in an appropriate manner, for example by means of an apertured nozzle.

When working according to the process of the present invention there are obtained, under the same ethylene pressures, suspension copolymers whose ethylene content is higher than the ethylene content of the suspension copolymers prepared by the process described in U.S. Patent 2,485,796 according to which the total amount of the vinyl ester is placed in the polymerization vessel.

According to a particularly advantageous modification of the process of the present invention the vinyl ester is metered in by means of an atomizer nozzle disposed above the liquid level since by this method the vinyl ester is at once charged with ethylene to the maximum extent.

The table hereunder shows the ethylene content of the copolymers in dependence on the ethylene pressure applied and the method of metering in the ethylene.

| Ethylene pressure (atmospheres gage): | Percent of ethylene content (introduction by means of an apertured nozzle) | Percent of ethylene content (introduction by means of an atomizer nozzle) |
|---|---|---|
| 10 | 3.8/2.9 | 4.5/4.8 |
| 15 | 7.5/6.5 | 8.0/7.9 |
| 20 | 8.2/10.0 | 9.9/11.2 |
| 50 | 16.2/16.8 | 20.3/21.5 |
| 150 | 29.6/30.1 | 38.9/40.5 |
| 300 | 49.4/50.7 | 57.8/58.3 |

The process according to the invention is, moreover, characterized by the fact that suspension copolymers are obtained thereby which, besides having high K values (determined according to Fikentscher), practically have no content of residual monomer.

When working according to the new method, suspension stabilizers known per se are used, for example polyvinyl alcohols, water-soluble salts of copolymers of unsaturated mono- or dicarboxylic acids, such as the ammonium salt or the alkali metal salts of copolymers of styrene and maleic anhydride, for example of a copolymer of the aforementioned monomers having a monomer ratio of 1:1, furthermore water-soluble cellulose derivatives.

Exemplary of the free radical polymerization catalysts that may be used in the process of the invention are organic per-compounds soluble in vinyl esters, for example diacyl peroxides such as dibenzoyl peroxide, dilauroyl peroxide, above all azo compounds, for example azobisisobutyronitrile.

As monomers which are copolymerizable with vinyl esters and which may also be used in the process of the invention, there may be mentioned, for example, acrylic acid and methacrylic acid or esters of the aforementioned acids and aliphatic saturated monohydric alcohols containing 1 to 8 carbon atoms, furthermore semi-esters or di-esters of $\alpha,\beta$-unsaturated dicarboxylic acids, for example semi-esters of maleic acid or fumaric acid and aliphatic saturated monohydric alcohols containing 1 to 8 carbon atoms, furthermore vinyl sulfonic acid or the alkali metal salts thereof. The aforementioned monomers which are copolymerizable with vinyl esters may be used in amounts up to 50%, calculated on the weight of the vinyl ester or vinyl esters.

The colorless copolymers may be used in the lacquer industry as primers and adhesives in a variety of fields, for example for the bonding of sheets and interlayers of safety glass, as thermoplasts, as vibration-damping material, and the like. The copolymers may be hydrolized to yield modified polyvinyl alcohols which, depending on the ethylene content, are soluble or swellable in few solvents only and may be shaped in the thermoplastic state into a variety of products.

The following examples serve to illustrate the invention, but they are not intended to limit it thereto:

EXAMPLE 1

Recipe 2700.0 grams of water
2.0 grams of a suspension stabilizer such as, for example, polyvinyl alcohol, ammonium salt of maleic anhydride/styrene (molar ratio 1:1)-copolymer
1000.0 grams of vinyl acetate
1.0 gram of azobisisobutyronitrile.

The amount of water and the suspension stabilizer were placed in an autoclave made of stainless steel (capacity: 5 l.) fitted with stirring means, thermometer and dosing openings. The atmospheric oxygen was removed by evacuating and introducing ethylene under pressure several times, the intended ethylene pressure of 10 atmospheres gage was adjusted, 10% of the vinyl acetate containing the catalyst were added thereto, the reaction mixture was warmed up to 65° C. and the residual amount of vinyl acetate metered in during the course of 3 hours. The reaction mixture was allowed to finish reacting for 1½ hours at 75° to 80° C. Then the pressure was released and the copolymer isolated, washed and dried. The copolymer had an ethylene content of 3.8% and a K value of 81.9.

EXAMPLE 2

This example was carried out under the same conditions as those described in Example 1 except that the ethylene pressure was adjusted at 15 atmospheres gage. The copolymer had an ethylene content of 7.5% and a K value of 86.0.

EXAMPLE 3

This example was carried out under the same conditions as those described in Example 1 except that the ethylene pressure was adjusted at 20 atmospheres gage. The copolymer had an ethylene content of 8.2% and a K value of 82.8.

EXAMPLE 4

This example was carried out under the same conditions as those described in Example 1 except that the ethylene pressure was adjusted at 50 atmospheres gage. The copolymer had an ethylene content of 16.2% and a K value of 85.5.

EXAMPLE 5

This example was carried out under the same conditions as those described in Example 1 except that the ethylene pressure was adjusted at 150 atmospheres gage. The copolymer had an ethylene content of 38.9% and a K value of 93.9.

EXAMPLE 6

This example was carried out under the same conditions as those described in Example 1 except that the ethylene pressure was adjusted at 300 atmospheres gage. The copolymer had an ethylene content of 49.4% and a K value of 83.1.

EXAMPLE 7

This example was carried out under the same conditions as those described in Example 3 except that n-vinyl butyrate was used instead of vinyl acetate at a pressure of 20 atmospheres gage. The copolymer had an ethylene content of 9.3% and a K value of 72.7.

EXAMPLE 8

This example was carried out under the same conditions as those described in Example 3 except that there was present an additional amount of 50 grams acrylic acid. The copolymer had an ethylene content of 8.6% and a K value of 68.9.

EXAMPLE 9

This example was carried out under the same conditions as those described in Example 3 except that there was present an additional amount of 50 grams 2-ethylhexylacrylate. The copolymer had an ethylene content of 8.9% and a K value of 79.2.

EXAMPLE 10

This example was carried out under the same conditions as those described in Example 3 except that there was present an additional amount of 10 grams vinyl sulfonic acid. The copolymer had an ethylene content of 9.8% and a K value of 76.5.

EXAMPLE 11

This example was carried out under the same conditions as those described in Example 3 except that there was present an additional amount of 50 grams maleic acid monobutyl ester. The copolymer had an ethylene content of 7.9% and a K value of 71.1.

We claim:

1. In a process for the production of copolymers of ethylene and vinyl ester by a suspension polymerization in the presence of water and a suspension stabilizer under the action of a free radical polymerization catalyst at a temperature within the range of from 40° to 120° C. and under an ethylene pressure of up to 300 atmospheres gage, the improvement which comprises dissolving the catalyst in the vinyl ester to form a solution free from solvents other than said vinyl ester and feeding the resulting solution in a continuous manner to the polymerization reaction mixture.

2. In a process for the production of copolymers of ethylene, a vinyl ester and up to 50%, calculated on the weight of the vinyl ester, of a further monomer copolymerizable with a vinyl ester by a suspension polymerization in the presence of water and a suspension stabilizer under the action of a free radical polymerization catalyst at a temperature within the range of from 40° to 120° C. and under an ethylene pressure of up to 300 atmospheres gage, the improvement which comprises dissolving the catalyst in the vinyl ester and further monomer to form a solution free from solvents other than said vinyl ester and further monomer and feeding the resulting solution in a continuous manner to the polymerization reaction mixture.

3. The process of claim 1, wherein ethylene pressures within the range of from 10 to 100 atmospheres gage are used.

4. The process of claim 2, wherein ethylene pressures within the range of from 10 to 100 atmospheres gage are used.

5. The process of claim 1, wherein the polymerization is carried out at a temperature within the range of from 60° to 85° C.

6. The process of claim 2, wherein the polymerization is carried out at a temperature within the range of from 60° to 85° C.

7. The process of claim 2, wherein an ester of vinyl alcohol and an aliphatic saturated monocarboxylic acid containing 1 to 4 carbon atoms is copolymerized.

8. A process according to claim 1 and wherein the vinyl ester having the catalyst dissolved therein is sprayed into the vapor phase above the liquid reaction mixture.

References Cited

UNITED STATES PATENTS

| 2,395,327 | 2/1946 | Hanford | 260—94 |
| 3,093,623 | 6/1963 | Ilnyckyj | 260—87.3 |

JOSEPH L. SCHOFER, Primary Examiner
S. M. LEVIN, Assistant Examiner

U.S. Cl. X.R.

161—203; 260—78.5, 80.8, 80.81, 87.3, 91.3